(12) United States Patent
Scholl et al.

(10) Patent No.: US 6,273,064 B1
(45) Date of Patent: Aug. 14, 2001

(54) CONTROLLER AND CONTROL METHOD FOR AN INTERNAL COMBUSTION ENGINE USING AN ENGINE-MOUNTED ACCELEROMETER

(75) Inventors: David James Scholl, Huntington Woods, MI (US); Kevin Ronald Carlstrom, Fort Wayne, IN (US); Stephen L. Hahn, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,470

(22) Filed: Jan. 13, 2000

(51) Int. Cl.$^7$ ........................................................ F02P 5/00
(52) U.S. Cl. .................... 123/406.24; 123/435; 73/35.04
(58) Field of Search ............................... 123/406.24, 435, 123/406.41, 406.42, 406.43; 73/35.03, 35.04, 117.3

(56) References Cited

U.S. PATENT DOCUMENTS

| | | | |
|---|---|---|---|
| 4,161,162 | 7/1979 | Latsch et al. ........................ | 123/32 EA |
| 4,364,260 | * 12/1982 | Chen et al. ............................... | 73/35 |
| 4,433,381 | * 2/1984 | Wilkinson ........................ | 364/431.05 |
| 4,984,546 | 1/1991 | Shimomura et al. ................. | 123/425 |
| 5,027,773 | 7/1991 | Shimomura et al. ................. | 123/425 |
| 5,101,788 | 4/1992 | Demizu et al. ....................... | 123/425 |
| 5,229,945 | 7/1993 | Demizu et al. ................. | 364/431.04 |
| 5,339,245 | 8/1994 | Hirata et al. ..................... | 364/431.08 |
| 5,392,642 | 2/1995 | Tao ........................................ | 123/425 |
| 5,535,722 | 7/1996 | Graessley et al. .................... | 123/425 |
| 5,698,776 | 12/1997 | Tomisawa .............................. | 73/115 |
| 5,715,794 | 2/1998 | Nakamura et al. ................... | 123/425 |
| 5,778,857 | 7/1998 | Nakamura et al. ................... | 123/425 |
| 5,893,349 | 4/1999 | Rado .................................... | 123/425 |

\* cited by examiner

*Primary Examiner*—Henry C. Yuen
*Assistant Examiner*—Mahmoud Gimie
(74) *Attorney, Agent, or Firm*—Jerome R. Drouillard

(57) ABSTRACT

A control system and method for obtaining combustion stability in an internal combustion engine including an accelerometer mounted on the engine for detecting engine block vibrations and an engine controller for processing an accelerometer output signal indicating engine block vibration intensity to measure cylinder combustion energy, the energy measurement being correlated to other combustion parameters including indicated mean effective pressure (IMEP), the controller developing a control signal that may be used in a closed loop fashion to adjust engine variables including exhaust gas recirculation, air/fuel ratio, and spark advance, thereby adjusting the engine operating characteristics to achieve optimum combustion energy.

8 Claims, 4 Drawing Sheets

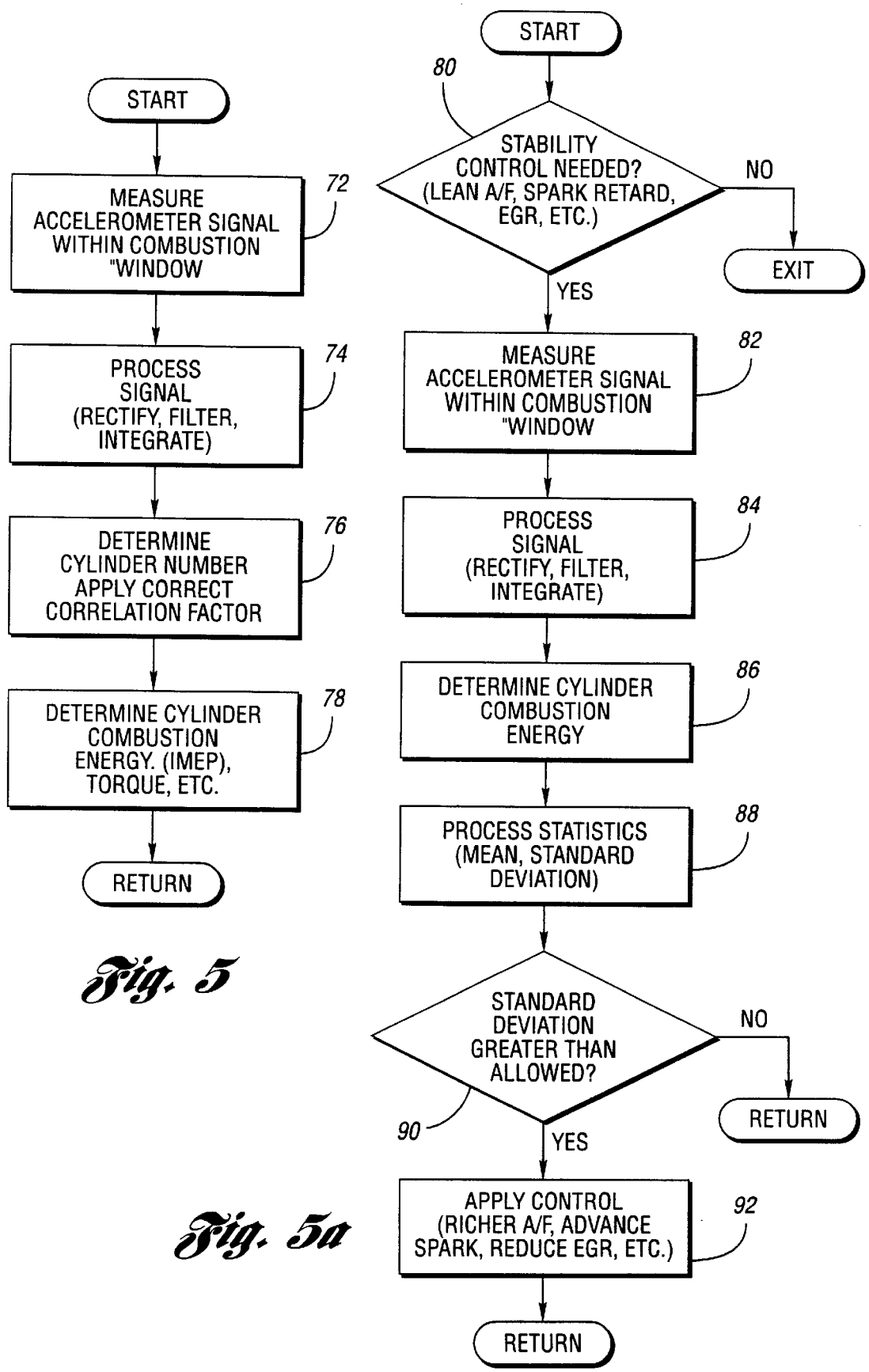

CONTROLLER AND CONTROL METHOD FOR AN INTERNAL COMBUSTION ENGINE USING AN ENGINE-MOUNTED ACCELEROMETER

TECHNICAL FIELD

The invention relates to the control of internal combustion engines for achieving optimum combustion stability.

BACKGROUND OF THE INVENTION

It is known design practice to calculate indicated mean effective pressure (IMEP) for an internal combustion piston engine using measured in-cylinder pressure obtained with an in-cylinder pressure sensor. The sensor provides cylinder pressure data at various crank angles. As described by Haywood in a publication entitled "Internal Combustion Engine Fundamentals" (1988, p.715), IMEP is a measure of the amount of work delivered to the piston during the compression and expansion stroke for each cycle per unit displaced volume. This information is used to establish optimum valve timing, air/fuel ratio, and optimum exhaust gas recirculation to achieve increased fuel economy and reduced emissions. The use of in-cylinder pressure sensors in this way for high volume production applications is costly, however, because the pressure sensors themselves are expensive. Further, locating the sensors in the cylinder is difficult and each cylinder requires its own sensor.

The calculation of indicated mean effective pressure for production engine applications using such pressure sensor data requires engine control microprocessors with substantial processing power and speed. Further, such control methods are characterized by sensor degradation and variability in system components.

BRIEF DESCRIPTION OF THE INVENTION

The invention includes an engine-mounted accelerometer to obtain measured characteristic values for cylinder combustion energy. Other combustion measurements, including mean effective pressure and torque, also can be correlated to the accelerometer output.

A single accelerometer may be used to obtain engine vibration data. The accelerometer is mounted on the exterior of the engine block and measures output from each cylinder. The calculation of indicated mean effective pressure can be performed in real-time by a typical electronic engine control microprocessor. If the engine is equipped with a broad band accelerometer as part of a knock control system, the same accelerometer may be used in practicing the invention. An example of a knock control system using an engine accelerometer of this kind may be seen by referring to U.S. Pat. No. 5,535,722.

The more efficiently the engine converts chemical energy of the fuel, the greater the power that is available at the crankshaft. But increased combustion efficiency with normal combustion also results in more energy being transferred to the engine block in the form of vibrations. There is a distinct and detectable correlation between in-cylinder combustion energy and engine block vibrations sensed by the accelerometer. The engine-mounted accelerometer is able to detect variations in combustion energy and the system of the invention will control that variation to a predetermined level.

Indicated mean effective pressure (IMEP) is one element of the total combustion energy. The other components are the energy absorbed by the mass of the engine in the form of vibrations, etc.

According to one aspect of the invention, the combustion energy information is monitored and a corrective action can be taken in a closed loop fashion if the combustion energy varies more than a predetermined amount. The deviation can be either from a statistical mean, or from recent combustions or from a predetermined value. Corrective action can be achieved by appropriately adjusting air/fuel ratio, spark timing or exhaust gas recirculation.

An engine normally is operated at stoichiometry with the spark timing set at the mean best torque value (MBT). Under certain conditions, however, an engine may be operated purposely under conditions where stability must be compromised. This may occur, for example, when the engine is running with a high spark retard and a lean air/fuel ratio during cold starts. This will quickly bring the catalytic converter of the engine to a desired operating temperature. Deviations from the optimum engine combustion stability may be intentionally incurred also when the engine is operating lean of stoichiometry for fuel economy reasons or when the engine is running with a large percentage of exhaust gas recirculation for purposes of exhaust gas emission reduction. Unlike prior art systems where such control of engine stability is done open loop with results that vary from engine-to-engine, non-standard engine operation can be achieved in a closed loop fashion using the teachings of the invention. This will permit the engine to tolerate a spark retard and a lean air/fuel ratio, for example, without objectionable erratic combustion occurring.

The invention is capable of using the engine vibration data obtained from the engine-mounted accelerometer to keep track of the characteristics of the combustion event and the associated energy level of the combustion and to take corrective action if the variation of the combustion event is greater than a desired amount.

The invention may use a single accelerometer or multiple accelerometers to detect the combustion energy in each cylinder of a multiple cylinder engine. The engine vibration data sensed by an accelerometer is sampled during a defined window in the combustion cycle during which combustion occurs. The window is calculated using camshaft and crankshaft position sensor data. This same data will identify the cylinder where the engine vibrations originate.

The accelerometer data, after being filtered and rectified, is measured (i.e., integrated) to obtain cylinder combustion energy. This computed value can be compared to normal combustion energy values with stable combustion. If the computed value deviates more than a desired amount, the system will appropriately adjust spark timing, air/fuel ratio or exhaust gas recirculation.

BRIEF DESCRIPTION OF THE DRAWINGS

FIG. 5 is a flowchart in block diagram form showing the process steps for using the accelerometer data to determine cylinder combustion energy; and FIG. 5a is a flowchart of the control process of the invention indicating the process steps that are used to determine combustion energy and the steps that are needed to apply a corrective action to maintain the engine performance within a desired deviation from optimum performance.

PARTICULAR DESCRIPTION OF THE INVENTION

Figure 1:
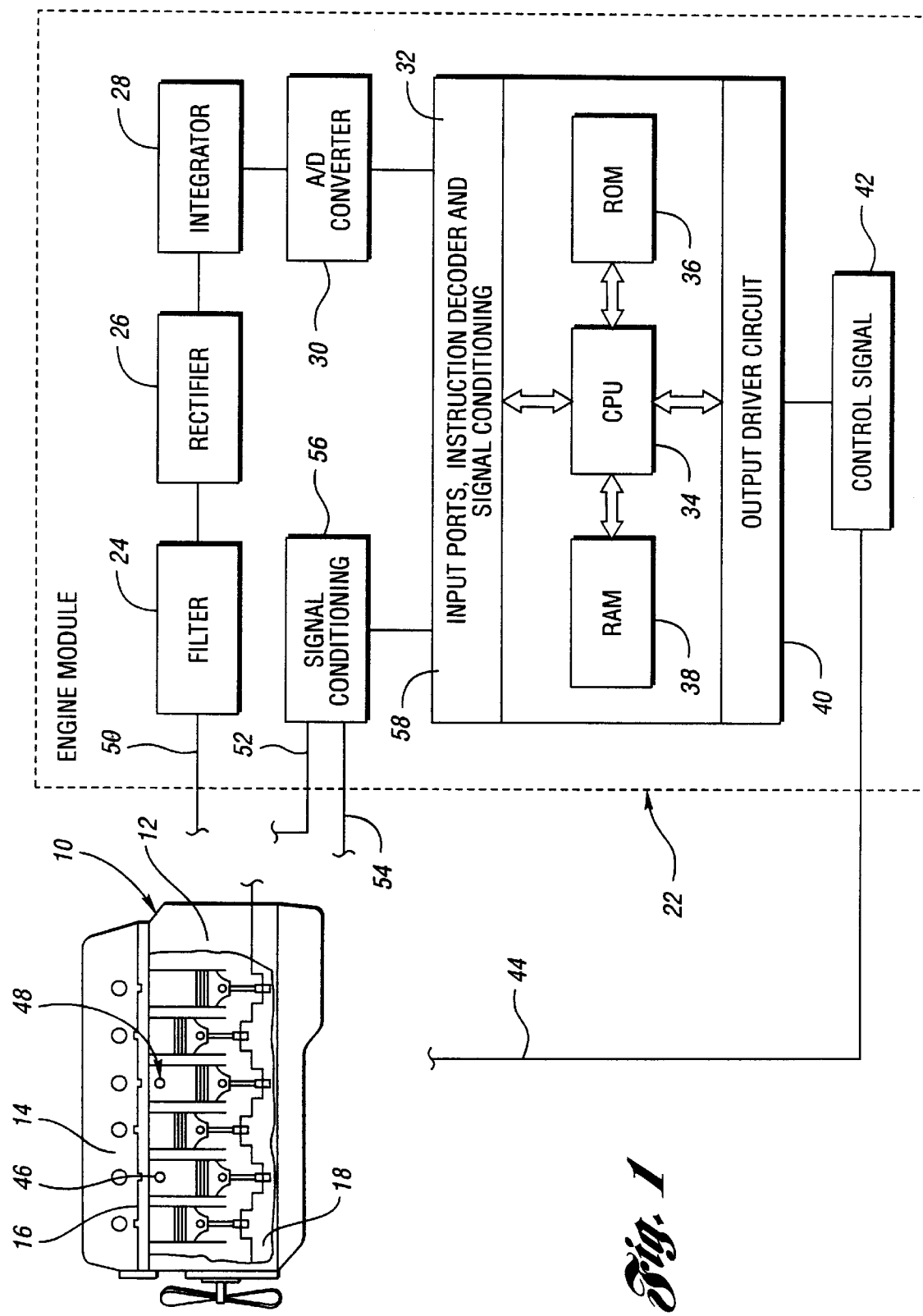
FIG. 1 is a schematic diagram of an engine controller for an internal combustion engine capable of embodying the invention.

In FIG. 1, an internal combustion engine is schematically shown at 10. It includes a cylinder block 12, and an overhead valve body 14. The valves within the valve body 14 are controlled by a camshaft 16, which is geared or otherwise drivably connected to engine crankshaft 18 with a 1:2 speed ratio.

An accelerometer 48 is directly mounted on the engine block 12. An accelerometer of this type may be used in the knock detection control system of U.S. Pat. No. 5,535,722. A typical accelerometer would be a Hall-effect sensor or a piezoelectric sensor. Such sensors are well known in the art. They are described, for example, in Bosch Automotive Handbook, 3d Edition, pages 108–109.

An engine control module 22 includes a broad band filter circuit 24, a rectifier circuit 26, an integrator circuit 28, an analog-to-digital converter 30 for converting the analog signal obtained from the accelerometer, and a processor 32 which includes a central processor unit (CPU) 34, a read-only memory (ROM) 36, a random access memory (RAM) 38, and an output driver circuit 40. The output driver circuit develops a control signal at 42, which is distributed through a signal flow path 44 to an engine controller 46, which may be an air/fuel ratio controller, a spark retard controller, or an EGR valve controller, all such controllers being well known in the art.

Accelerometer 48 develops an engine vibration signal, which is delivered through signal flow path 50 to the broad band filter circuit 24.

A camshaft position signal is delivered to camshaft position signal flow path 52, and a crankshaft position signal is delivered from a crankshaft position signal sensor to signal flow path 54. These signals are delivered to a signal conditioning circuit 56 before they are transferred to the input ports and instruction decoder portion 58 of the microprocessor 32.

Figure 3:
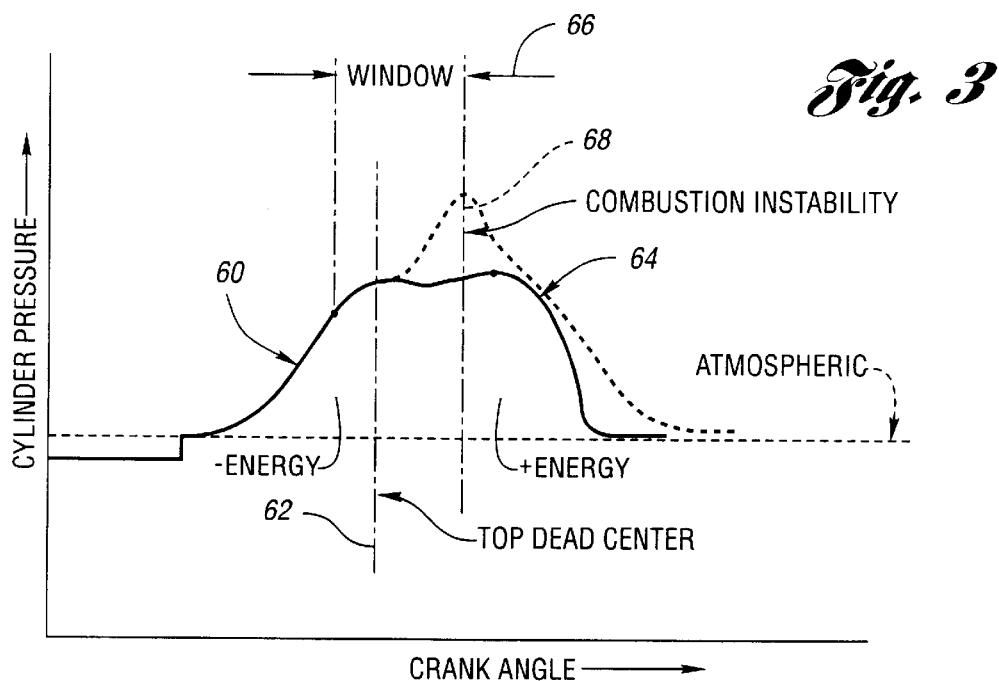
FIG. 3 is a plot of cylinder pressure versus crank angle for the combustion chamber of an internal combustion engine.

As shown in FIG. 3, cylinder pressure, as measured using a pressure sensor, is plotted on the ordinate. The abscissa indicates crank angle.

The cylinder pressure at various crank angles is plotted at 60. The top dead center for the cylinder, at which the pressure measurement is taken, is indicated at 62. The portion of the curve on the left side of the top dead center position 62 represents the compression stroke. When the top dead center position is reached, further stroking of the piston in the cylinder will develop positive work or energy, as shown at the right side of the top dead center position 62.

The expansion stroke of the piston develops a pressure plot 64. Using the clearance volume (combustion chamber volume), connecting rod length and piston stroke, a pressure versus volume curve can be generated from the information in FIG. 3. This technique is known in the art. The resulting diagram is shown in FIG. 3a for a complete cycle.

Figure 3A:
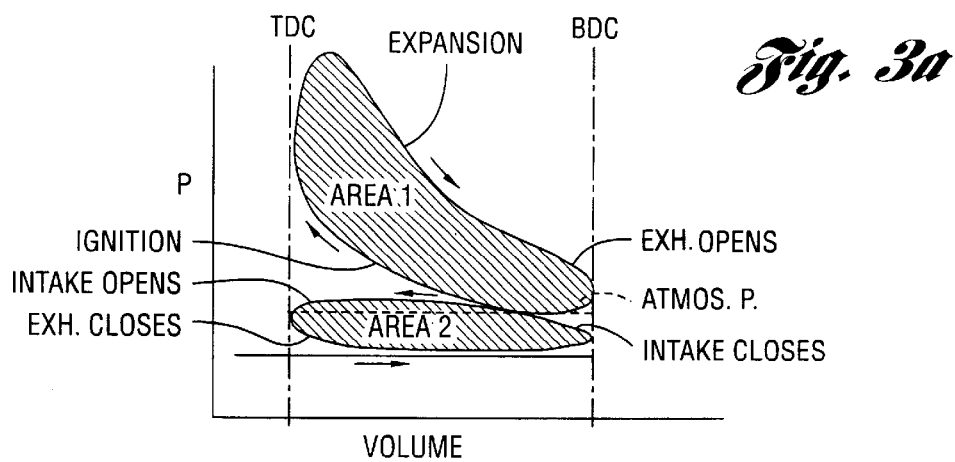
FIG. 3a is a plot of combustion chamber volume versus cylinder pressure for a four-stroke combustion cycle.

Area 1 in FIG. 3a represents the gross work done during compression/expansion. Area 2 represents the pumping work of the intake exhaust strokes, or the work required to move the charge through the engine.

A so-called "window", indicated at 66, shows the portion of the curve where the accelerometer readings are sampled. This is the area at which combustion is known to occur. The window is determined using a crankshaft position signal in signal flow line 54, and a camshaft position signal in signal flow line 52, which are delivered to the microprocessor 32 through the signal conditioning circuit 56.

The mathematical relationship between cylinder pressure and combustion energy or work is expressed as follows:

$$\int_{CA_1}^{CA_2} P dv = \text{work}_{CA_1 \to CA_2} \propto \text{combustion energy}_{CA_1 \to CA_2}$$

where CA is crank angle, and P, combustion chamber pressure, is a function of crank angle, crank radius, cylinder diameter and piston rod length, which determine combustion chamber volume "v" at any instant.

In FIG. 3, a typical cylinder pressure versus crank angle plot is represented by the curves 60 and 64. During stable engine operation, these curves will be identical or nearly identical from cycle to cycle as long as the engine speed and load remain constant. If the combustion becomes unstable, a sharp rise in cylinder pressure will be noted, as indicated at 68 (or a pressure drop will occur, as indicated at 64). That instability is very evident in the window region 66 where the combustion is expected to occur.

For any given cylinder, the pressure and angle characteristics illustrated in FIG. 3 will be unique depending on the combustion characteristics of that cylinder. The plot of FIG. 3 represents the cylinder versus angle characteristic for a single cylinder at a given instant in the combustion cycle. It thus is possible, using the crank angle data and the camshaft angle data in signal flow paths 52 and 54, to determine which cylinder is experiencing the combustion instability. Further, since the camshaft angle information can be used to indicate the beginning of combustion as well as the end of combustion, data concerning the crank angle positions where the intake valve closes and the exhaust valve opens can be used to define the window 66.

Figure 2:
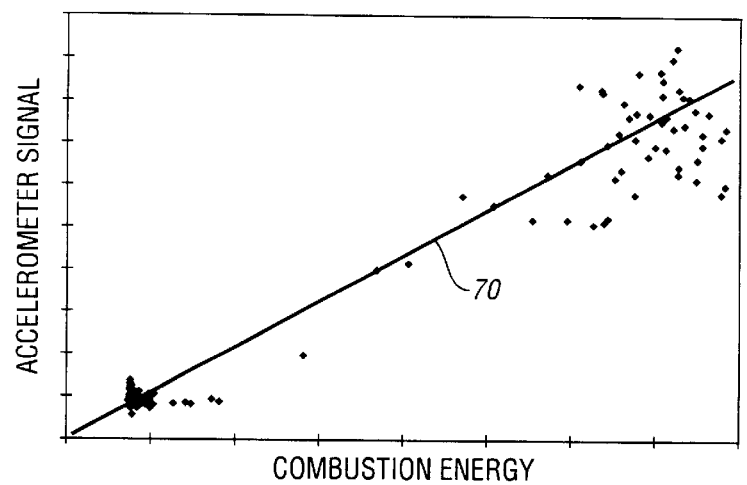
FIG. 2 is a plot of the relationship of the engine vibration accelerometer signal to combustion energy using empirical test data.

The plot of FIG. 2 shows the relationship between combustion energy sampled within the window and accelerometer data collected within that same window. A straight line indicating the trend of the relationship between the accelerometer signal and the combustion energy is plotted as shown at 70. As the combustion energy increases, the accelerometer signal also increases. It will be assumed that the linear relationship illustrated in FIG. 2, which is generally a trend line, will be characteristic of an engine operating within expected or normal combustion stability. Any constant shape curve, however, may be used to determine the characteristic.

As previously explained, the more efficiently the engine converts chemical energy, the more power will be available at the crankshaft. Increased combustion energy, assuming normal combustion, also results in more energy transmitted as engine block vibration. This is illustrated in the plot of FIG. 2.

The engine is controlled to provide better fuel economy and reduced emissions with various valve timing, various exhaust gas recirculation rates and various air/fuel ratios.

This is done by determining cylinder combustion energy utilizing the controller illustrated in FIG. 1. The signal received from the accelerometer, after passing through the broad band filter 24, is rectified at 26 and integrated at 28. At that point, the signal is an analog signal. The signal is converted to a digital signal at 30 and transmitted to the processor 32. The CPU will address the register in RAM where the digital signal is stored and will compare it to the value in ROM at 36, which represents the data indicated in the relationship shown, for example, in FIG. 2.

The accelerometer data is indicated in FIG. 2 for various levels of combustion energy when the engine is operating with acceptable combustion stability. If it is determined that the engine is operating in an unstable combustion zone, such as that illustrated in FIG. 3 at 68 or at 64, a corrective control signal is delivered at 42 and is transmitted through the signal flow path 44 to the engine controller 46, as previously described.

Samples of the accelerometer vibration signal are obtained during each background loop of the processor. The samples are taken within the window 66 shown in FIG. 3.

Figure 4A:
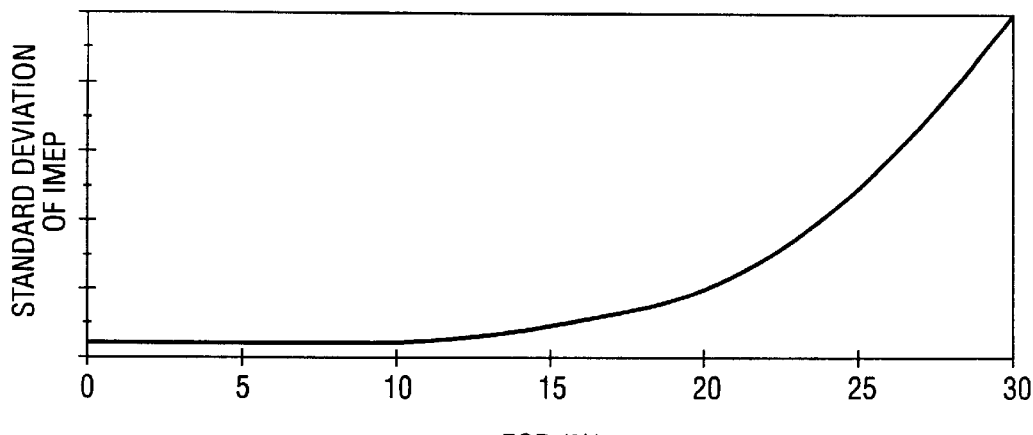
FIG. 4a is a plot of combustion stability versus exhaust gas recirculation percentage.
Figure 4B:
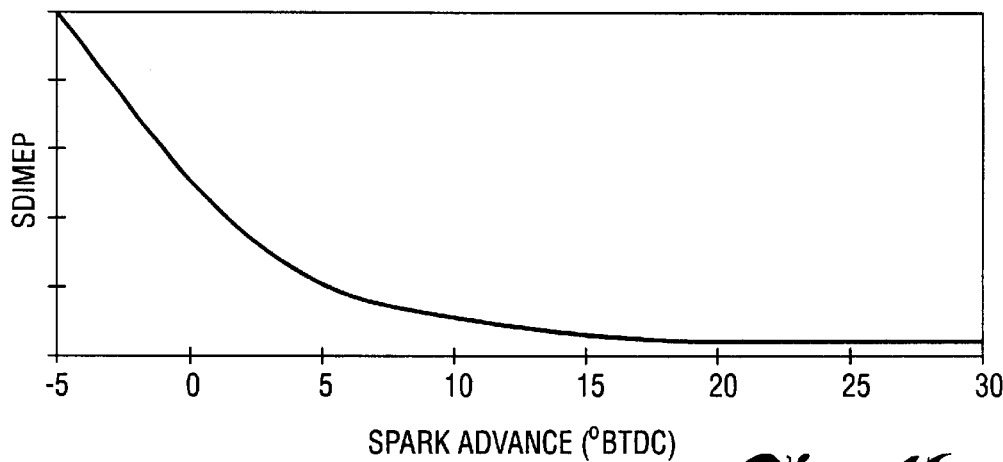
FIG. 4b is a plot of the standard deviation of indicated mean effective pressure versus spark advance for a typical internal combustion engine.
Figure 4C:
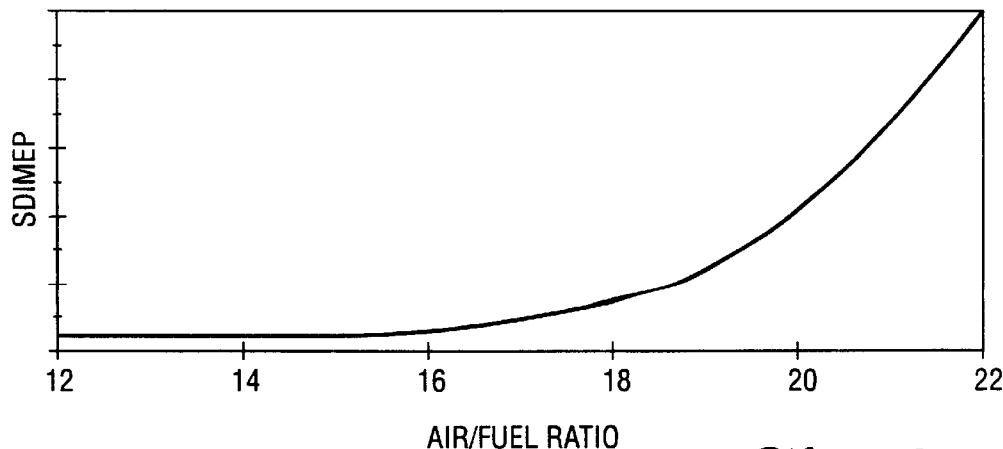
FIG. 4c is a plot of the standard deviation of indicated mean effective pressure versus air/fuel ratio for a typical internal combustion engine.

The corrective action that is taken to restore the engine to an acceptable stability level makes use of the information of FIGS. 4a, 4b or 4c, which, respectively, indicate EGR percentage, spark advance, or air/fuel ratio for various standard deviations of the indicated mean effective pressure. The information in FIGS. 4a, 4b and 4c is stored in ROM of the microprocessor where it can be accessed by the CPU in each control loop in developing an appropriate control signal at 42. The corrective action proceeds in this closed loop fashion until instability is controlled to an acceptable level.

The plot of FIG. 4a indicates that the standard deviation of mean pressure increases as exhaust gas recirculation increases. The plot of FIG. 4a has an upward trend. In contrast, the plot of FIG. 4b, which shows the relationship between the standard deviation of indicated mean effective pressure and spark advance, has a downward trend. Finally, the trend of the relationship between air/fuel ratio and standard deviation of indicated mean effective pressure is upward, as seen in FIG. 4c.

The processor may access the data registers for any one or more of the parameters shown in FIGS. 4a, 4b and 4c.

FIG. 5 shows a flowchart for the determination of the cylinder combustion energy using accelerometer data. FIG. 5 shows that the accelerometer signal is measured within the window at action block 72. This measurement is taken when combustion is known to occur, as explained previously. The sampled signal, according to a preferred embodiment of the invention, then is processed at 74 by rectifying it, filtering it, and integrating it as explained previously. Other techniques also may be used to process the sampled signal without departing from the scope of the invention. The current cylinder is identified, as shown at 76, using camshaft angle data and crankshaft angle data as explained previously.

A correction factor is applied depending upon the particular cylinder at which the combustion energy is being determined. Since in this case only a single accelerometer is used on the engine block, the distance between a particular cylinder and the accelerometer is greater or less than the distance between a companion cylinder and the accelerometer. The vibration signal flow path through the engine block thus is different for each cylinder. This is true in part because of structural baffles or other structural interference with the transfer of the vibration signal from a given cylinder to the accelerometer. Thus, each cylinder has a unique correlation factor, which is determined empirically through test procedures. This correlation factor is applied at step 76 in FIG. 5.

The cylinder combustion energy is determined at action block 78 using the relationship in ROM indicated in FIG. 2.

FIG. 5a is a flowchart that shows control steps that are used in eliminating combustion instability. The control routine shown in FIG. 5a, which is carried out during each control loop, includes the initial steps that are described with reference to FIG. 5. At the end of the routine, control steps used to optimize combustion and to correct for interactions between control parameters that adversely affect combustion stability.

The standard deviation of combustion energy for a given air/fuel ratio change, spark advance change and EGR change may vary depending on the engine that is used. The standard deviation may change also as other parameters are varied.

In FIG. 5a, determination is made at 80 regarding whether stability control is needed. This decision is made while taking into consideration whether the engine should be purposely operated under conditions where stability is compromised, as explained previously in the brief description of the invention. The readings of the accelerometer are taken at 82 within the combustion window. If stability control is needed, the signal obtained within the combustion window is rectified, filtered and integrated at 84 and combustion energy is obtained at 86, as previously described. A comparison then is made at 88 with the standard deviation. If the standard deviation, as determined at 90, is greater than allowed, a control signal is developed at 42, as shown at action block 92.

Although a preferred embodiment of the invention has been disclosed, it will be apparent to persons skilled in the art that modifications may be made without departing from the scope of the invention. All such modifications and improvements are intended to be covered by the following claims.

What is claimed is:

1. A control system for an internal combustion engine having a cylinder block with multiple cylinders, a piston in each cylinder and defining therewith an air/fuel combustion chamber, a crankshaft rotatably driven by the pistons, an air/fuel intake valve and a combustion gas exhaust valve for each combustion chamber;

a rotary camshaft connected to each valve whereby the valves are activated between open and closed states, the camshaft being connected to the crankshaft with a defined speed ratio;

an accelerometer vibration sensor secured to the cylinder block whereby engine block vibrations created by combustion are sensed, the energy of the vibrations creating a vibration signal related functionally to combustion energy;

a crankshaft position sensor for the crankshaft, the crankshaft position sensor supplying a crankshaft position signal;

a camshaft position sensor for the camshaft whereby a given camshaft position corresponds to a defined intake and exhaust valve state for each cylinder;

an electronic engine controller comprising a microprocessor in electrical communication with said sensors, said microprocessor having an integrator for integrating the vibration signal and a processing unit for computing the combustion energy level and identifying the combustion chamber corresponding to the vibration signal;

said microprocessor having memory portions containing a known relationship between accelerometer vibration sensor signals and combustion energy when combustion is stable;

said processor unit of the microprocessor calculating the combustion energy as a function of sensor data from the sensors and comparing it with memory data to detect combustion instability.

2. The control system set forth in claim 1 wherein the processor unit includes means for determining, using sensor data from the crankshaft position sensor and the camshaft position sensor, a crankshaft position window within which combustion is known to occur.

3. The control system set forth in claim 1 wherein the processor includes means for computing combustion energy in each combustion chamber during a crankshaft position window when combustion is known to exist, the position window being determined by the processor unit based upon camshaft sensor data and crankshaft position sensor data.

4. The control system set forth in claim 1 including a spark controller for advancing and retarding the spark timing and means for adjusting the spark timing in response to the detection of combustion instability whereby combustion stability is maintained in a closed loop fashion.

5. The control system set forth in claim 1 including an air/fuel ratio controller for changing air/fuel ratio, and means for adjusting the air/fuel ratio in response to the detection of combustion instability whereby combustion stability is maintained in a closed loop fashion.

6. The control system set forth in claim 1 including an exhaust gas recirculation controller and means for adjusting the rate of exhaust gas recirculation in response to the detection of combustion instability whereby combustion stability is maintained in a closed loop fashion.

7. A method for controlling combustion stability in the combustion chambers of a multiple cylinder combustion engine, the engine including a cylinder block, a crankshaft and a camshaft comprising the steps of:

measuring engine vibration energy caused by combustion;

identifying the cylinder at which combustion occurs based on instantaneous crankshaft and camshaft positions;

measuring vibration energy at the cylinder block using an accelerometer;

storing a known relationship between accelerometer readings and combustion chamber energy during a time interval when combustion is stable;

computing cylinder combustion energy in the engine cylinders as a function of cylinder pressure; and comparing measured vibration energy with the known relationship between accelerometer readings and combustion chamber energy to detect combustion instability.

8. The method set forth in claim 7 including the step of adjusting in a closed loop fashion one or more engine performance parameters during operation with varying speeds and loads in response to the detection of combustion instability whereby combustion instability is controlled to acceptable levels, the performance parameters including spark timing, air/fuel ratio and exhaust gas recirculation rate.

* * * * *